April 8, 1930.　　　G. F. WEBB　　　1,753,541
TURNOVER TOASTER
Filed March 18, 1929　　2 Sheets-Sheet 2
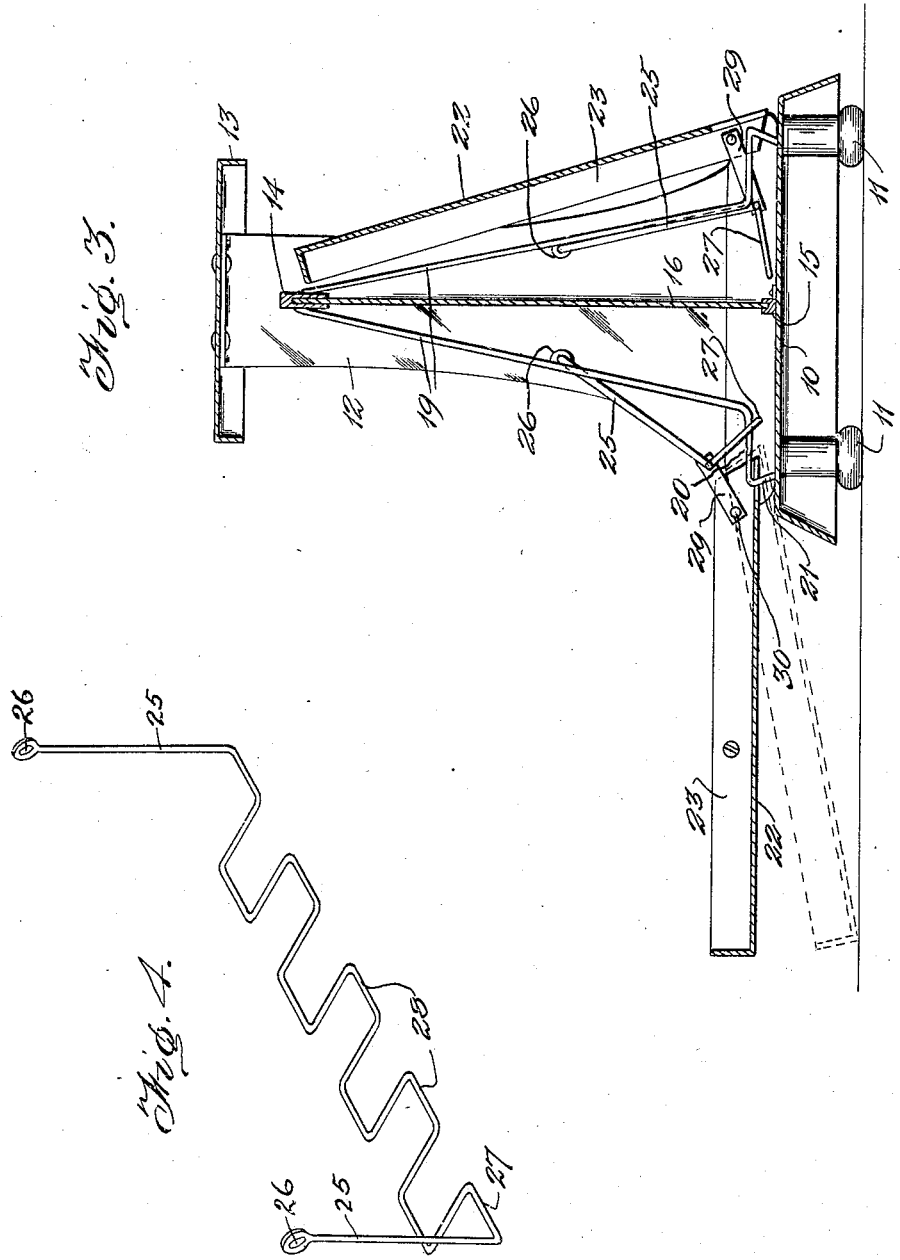
INVENTOR.
GEORGE F. WEBB
ATTORNEY Patented Apr. 8, 1930

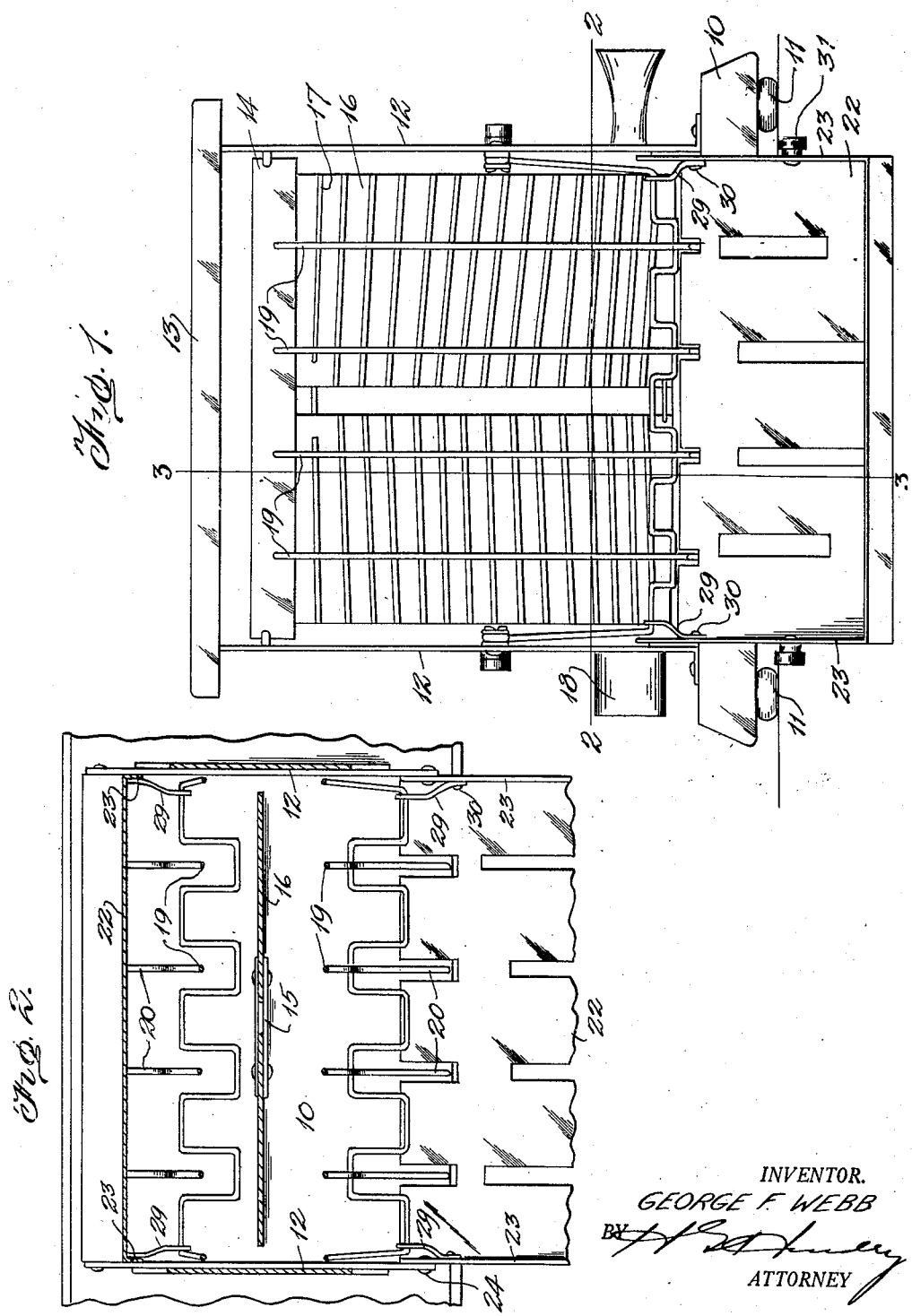

1,753,541

UNITED STATES PATENT OFFICE

GEORGE F. WEBB, OF HAMILTON, ONTARIO, CANADA

TURNOVER TOASTER

Application filed March 18, 1929. Serial No. 347,894.

This invention relates to electric toasters and has special reference to an electric toaster arranged for automatically reversing the slice being toasted with each opening and closing of the toaster.

One important object of the invention is to improve the general construction of devices of this character so as to provide a simple and efficient device in which the reversing mechanism will act automatically on each opening of the toaster.

A second important object of the invention is to provide, in a toaster of this description, a slice supporting rack and novel means to push the lower edge of the slice off of the rack upon opening of the toaster.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a front elevation of the toaster with one side open.

Figure 2 is a section on the line 2—2 of Figure 1.

Figure 2 is a section on the line 3—3 of Figure 1.

Figure 4 is a detail view of a certain tooth bar used herewith.

In the present embodiment of the invention there is provided a base 10 supported on heat insulating legs 11 and at each end of this base is an upwardly extending standard 12, these standards being connected by a top 13 at their upper ends.

Between the upper parts of the standards is a cross bar 14 and at the base is a second cross bar 15. These cross bars support insulating plates 16 whereon is wound resistance wires 17 leading to a plug socket 18 for convenience in connecting the device to a house circuit. Also supported by the bar 14 are the upper ends of toast rack bars 19 which extend downwardly and outwardly toward the side edges of the base and terminate shortly above the base in horizontal feet 20 having downwardly extending toes 21 engaging the base 10. As will be observed from Figures 1 and 2 these bars are spaced from each other and in use the slice of bread to be toasted is supported on the feet 20, the slice leaning against the inclined upper portions of the bars. At each side of the toaster is a cover plate which consists of a flat plate 22 having side flanges 23 and pivots 24 extend through these side flanges and the lower parts of the standards 12 to pivotally connect the cover to the standards so that it may swing from the full line position shown in Figure 3 at the right to the dotted line position shown in that figure at the left.

The means for removing the toast automatically from the rack comprises a substantially U-shaped swinging member having side arms 25 pivoted to the standards 12 as at 26 and depending normally behind the bars 19. The lower ends of these side arms 26 are connected by a cross bar 27 here shown as of crenellated form to provide pusher teeth 28 which, when the member is swung forward, project between the rack bars 19 to push the lower end of the slice being toasted off of the feet 20. To operate these cross bars links 29 are provided which are pivoted to the flanges 23 and 30, the other end of said links embracing the wire of the swinging bar adjacent the sides 29.

Now, referring to Figure 3, it will be seen that when the cover 22 is closed the swinging frame lies almost entirely behind the supporting rack 19 while, when the cover is open by manipulation with the hand holds 31 the links 29 pull forwardly on the swinging frame and cause the portions 28 to push the lower end of the slice off of the rack so that it slides down onto the cover in such position that when the cover is again closed the face formerly away from the rack 19 will now be brought up against the rack.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In an electric toaster, a base, spaced standards extending up from the base, an inclined bread supporting rack between said standards, a swinging crenellated finger bar supported from said standards and having its alternate crenellations movable between positions behind and in front of said rack, and means to actuate said bar.

2. In an electric toaster, a base, spaced standards extending up from the base, an inclined bread supporting rack between said standards, a swinging crenellated finger bar supported from said standards and having its alternate crenellations movable between positions behind and in front of said rack, a cover for said rack hinged to swing on a horizontal axis between a closed position in front of the rack and an open position extending outwardly and downwardly from the base, and a link connecting said finger bar and cover.

3. In an electric toaster, a base, spaced standards extending upwardly from said base, a toast supporting rack extending upwardly and inwardly from said base and consisting of spaced bars having their lower ends supported by said base and provided with forwardly extending portions adjacent their lower ends substantially parallel to the base, a swinging bar of substantially U-shape having its arms pivoted at their upper ends to the standards and having its lower arm connecting portion crenellated, the alternate crenellations being movable rearwardly and forwardly beneath the forwardly extending portions of the rack bars, fingers extending upwardly from said arm connecting portions, and means to actuate the swinging bar.

4. In an electric toaster, a base, spaced standards extending upwardly from said base, a toast supporting rack extending upwardly and inwardly from said base and consisting of spaced bars having their lower ends supported by said base and provided with forwardly extending portions adjacent their lower ends substantially parallel to the base, a swinging bar of substantially U-shape having its arms pivoted at their upper ends to the standards and having its lower arm connecting portion crenellated, the alternate crenellations being movable rearwardly and forwardly beneath the forwardly extending portions of the rack bars, fingers extending upwardly from said arm connecting portions, a cover for said rack hinged to swing on a horizontal axis between a closed position in front of the rack and an open position extending outwardly and downwardly from the base, and a link connecting said finger bar and cover.

In testimony whereof I have affixed my signature.

GEORGE F. WEBB.